United States Patent [19]

Zimmermann et al.

[11] Patent Number: 5,364,527
[45] Date of Patent: * Nov. 15, 1994

[54] APPARATUS AND PROCESS FOR TREATING WATER

[76] Inventors: Heinz Zimmermann, Am Park 22, D-4156 Willich; Hans J. M. Manteuffel, Am alten Broich 213A, Langenfeld, both of Germany

[*] Notice: The portion of the term of this patent subsequent to Feb. 2, 2010 has been disclaimed.

[21] Appl. No.: 984,297

[22] Filed: Dec. 1, 1992

Related U.S. Application Data

[63] Continuation-in-part of Ser. No. 717,017, Jun. 18, 1991, Pat. No. 5,183,565.

[30] Foreign Application Priority Data

Jun. 20, 1990 [DE] Germany ............... 4019580

[51] Int. Cl.5 ........................................... B01D 24/46
[52] U.S. Cl. ................... 210/243; 210/269; 210/670; 204/149; 204/151
[58] Field of Search .............. 210/269, 670, 695, 748, 210/663, 665, 668, 669, 687, 662, 266, 243, 223; 204/149, 151

[56] References Cited

U.S. PATENT DOCUMENTS

| | | | |
|---|---|---|---|
| 2,793,183 | 5/1957 | Thurman | 210/669 |
| 2,794,777 | 6/1957 | Pearson | 204/151 |
| 3,074,863 | 1/1963 | Jasionowski | 204/151 |
| 3,764,499 | 10/1973 | Okubo et al. | 204/151 |
| 3,847,765 | 11/1974 | Uno et al. | 204/151 |
| 4,013,554 | 3/1977 | Reis et al. | 210/620 |
| 4,159,235 | 6/1979 | Kammel et al. | 204/149 |
| 4,326,935 | 4/1982 | Moeglich | 204/151 |
| 4,403,039 | 9/1983 | Ban et al. | 210/662 |
| 4,426,261 | 1/1984 | Fushihara | 204/151 |
| 4,596,641 | 6/1986 | Bridger et al. | 204/282 |
| 4,668,361 | 5/1987 | Klinkowski | 204/151 |
| 4,670,118 | 6/1987 | Klinkowski | 210/748 |
| 4,713,156 | 12/1987 | Gal et al. | 204/151 |
| 4,758,319 | 7/1988 | Klinkowski | 210/748 |
| 4,786,384 | 11/1988 | Gerhardt et al. | 204/149 |
| 4,880,511 | 11/1989 | Sugita | 204/151 |
| 5,026,465 | 6/1991 | Katz et al. | 204/151 |
| 5,183,565 | 2/1993 | Zimmerman et al. | 210/269 |

FOREIGN PATENT DOCUMENTS

| | | |
|---|---|---|
| 2844892 | 4/1980 | Germany . |
| 3341242 | 5/1985 | Germany . |
| 2901577 | 8/1987 | Germany . |
| 3805813 | 3/1989 | Germany . |
| 809685 | 3/1959 | United Kingdom . |

*Primary Examiner*—Cynthia L. Nessler
*Attorney, Agent, or Firm*—Herbert Dueno; Yuri Kateshov

[57] ABSTRACT

An apparatus for removing cations/anions from liquids including a container provided with an anode mounted centrally in the container, a cathode surrounding the anode and a layer of ion exchange material mounted between the cathode and anode, the cathode and a wall of the container form an outer space filled with water therebetween, the anode and cathode form a water-free inner space therebetween, the inner and outer spaces are connected with each other at opposite ends in order to generate a liquid circulation.

17 Claims, 8 Drawing Sheets

APPARATUS AND PROCESS FOR TREATING WATER

CROSS REFERENCE TO RELATED APPLICATIONS

This application is a continuation-in-part application of our co-pending application Ser. No. 07/717,017 filed Jun. 18, 1991, now U.S. Pat. No. 5,183,565, and based upon German Application P 40 19 580.5 filed Jun. 20, 1990 under the International Convention.

FIELD OF THE INVENTION

Our present invention relates to a method of removing cations and anions from liquids and to an apparatus for carrying out the method.

BACKGROUND OF THE INVENTION

Processes for the purification of liquids and apparatus for carrying out such processes are known. In the systems, liquids can be subjected to a voltage field causing separation of cations and anions and precipitation of the latter as a solid matter in extremely fine dispersion.

In addition to this electrolytic process, the liquid is often passed through an ion exchanger increasing the throughput rate of purified liquid. The chemical process of passing of the liquid through the ion exchanger also results in precipitation of a solid material. The increase of volume of treated liquid results in the continuous performance of the ion exchange process because the liquid flow does not have to be interrupted.

A combination of electrolytic and chemical processes have been described in German Patent document 33 41 242 disclosing the removal of oxygen from an aqueous solution. According to the teaching of the application the liquid flow passes through a permeable spatially extending ion exchanger. Simultaneously with the chemical treatment, the liquid is subjected to an electrical field propagating radially from concentrically mounted electrodes and extends coaxially with respect to the liquid flow. The oxygen produced in the ion exchange process is removed by appropriately mounted pipes.

German Patent document 38 05 813 discloses a loaded ion material which can be treated electrolytically, chemically or electrochemically without having to be removed from the apparatus. In this case the ion exchange material is subjected, for example, to a pulsating alternating electrical field or ionizing chemicals.

A basic drawback of all of the described above processes is that the solid material remains present so that it is possible for the precipitated solids to revert to the original state in a subsequent chemical or electrochemical process. This is undesirable and should be avoided.

Still another problem of the known devices is that they are incapable of reducing cations and anions with the same ion exchanger.

OBJECTS OF THE INVENTION

Therefore the principal object of the present invention is to improve the electrochemical process, so as to avoid the drawbacks characteristic to the prior art.

Still another object of the present invention is to provide an apparatus utilizing the process according to the invention for removing cations and anions from a liquid avoiding drawbacks of the prior art.

It is also an object of the invention to provide an improved apparatus for the purposes described which is of simple design, small size, high efficiency and high functional reliability while operating with a low energy requirement.

SUMMARY OF THE INVENTION

According to the invention an apparatus for treating liquids includes a layer of ion exchange material mounted between the anode and cathode. The latter form a free liquid-filled space used as a treatment space with the exchange layer and an outer liquid-filled space with a wall of a container receiving all elements mentioned above. The treatment and outer spaces are interconnected at opposite ends for liquid circulation.

The apparatus has a simple structure and is highly efficient. With a low energy requirement, both anions and cations can be removed using the same ion exchanger material. The latter is not blocked and both inorganic and organic compounds, particularly, salts, can be removed from the untreated water.

Diffusion distribution of pH and of ions is achieved as a result of the circulation. Mixing volumes of the liquid taken from inner and outer spaces and/or mixing of the same individually jointly with untreated water results in a stabilization of pH of the treated water. Regeneration of the ion exchange material, particularly of a resin, depends upon the concentration of hydrogen ions (protons).

As opposed to the prior art teaching using a particular ion exchange material not absorbing anions, the apparatus according to invention utilizes the ion exchange material to reduce both cations and anions. Further, the apparatus is able to separate inorganic and organic compounds contained in the untreated water with a reduced energy input and at a low pressure.

The outer and/or inner spaces opening into a settling space formed at the bottom are another important advantage of the apparatus according to the invention. Such structure insures the absence of a flocculated material in the treated water emerging from the apparatus.

The elongated anode, layers of the ion exchange material, cathode as well as both inner and outer spaces are formed coaxial with the anode mounted centrally in a structure which increases the efficiency of the apparatus.

Particularly advantageous is the structure having the anode provided in a spiral form on an outer wall of a perforated or slotted tube suspended centrally in the container. The layer of ion exchange material can be bounded on either both sides or only one by a grid, fabric or gauze.

Additionally, it was found advantageous to build in a partition separating treatment and outer spaces. The partition can be a tube inside of which the cathode is provided. The wall of the tube can be perforated.

Preferably, the inner tube, layer of ion material, partition, container wall, and annular intermediate spaces are all coaxial with respect to one another. An optimum flow inside the equipment is achieved provided that the whole structure is designed in a vertical plane.

In order to achieve simultaneous water removal at the top and bottom of the equipment a water removal pipe is provided with at least one inlet opening in the lower and upper part of the outer space. As a result, removal of a water mixture with different pH is enhanced.

Particularly advantageous is the provision of a multi-way valve controlling inlet and outlet pipes. The latter combination leads to controlling of the equipment by adjusting a single valve element.

Continuous treatment of the liquid with a high throughput is further enhanced by providing the apparatus with a double or multiple system operating in an alternate fashion.

A process according to the invention comprising the steps of:

(a) selectively:

($a_1$) introducing a liquid to be treated into the tube, treating thereby the liquid by exchanging calcium ions kept to the layer for hydrogen ions upon circulating the liquid between chambers formed between respective parts of the apparatus and extracting the liquid from the container, ($a_2$) introducing the liquid into the tube and into the outer space, treating thereby the liquid and extracting the liquid from the container, and ($a_3$) introducing the liquid into the outer space, treating thereby the liquid and extracting the liquid from the container;

(b) thereafter interrupting the feeding of the liquid; and (c) thereafter applying an electric field to the anode and cathode, regenerating thereby the layer by displacing calcium ions in the layer with hydrogen ions migrating from the anode to the cathode in the field.

The process renders several modes corresponding to a desired degree of treatment.

According to the invention, the ion-exchange layer includes at least two mutually bordering layers made of different materials, one of layers exchanging the cations and the other exchanging the anions, one of the layers encountering the flow first and the other layers encountering the flow subsequently to remove anions and cations selectively in succession. The one layer can liberate hydrogen ions (protons) and the other layer can liberate hydroxyl ions in a stoichiometric rate to the liberation of the hydrogen ions, so that protons and hydroxyl ions neutralize each other during the passage of water flow to be treated and the water reaches a desired pH-value. The two layers are preferably separated by a permeable dividing wall or partition preventing materials of the layers from mixing. The dividing wall can be a filter, sieve cloth or mesh, fleece or perforated foil.

BRIEF DESCRIPTION OF THE DRAWING

The above and other objects, features and advantages of the invention will become more readily apparent from the following description, reference being made to the accompanying highly diagrammatic drawing in which:

FIG. 1A is a detail section of the ion exchange shell:

SPECIFIC DESCRIPTION

Figure 1:
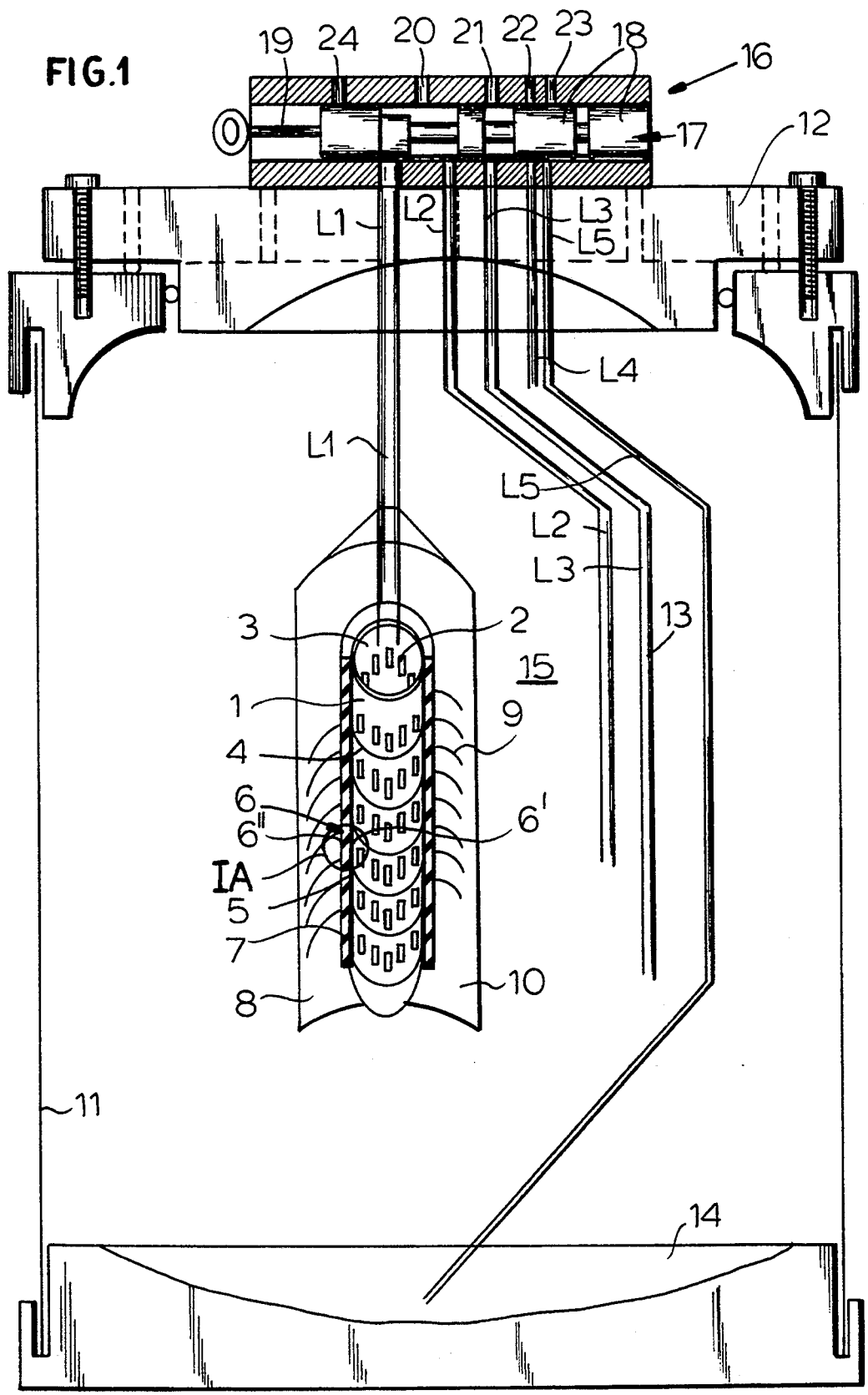
FIG. 1 is a vertical section through the apparatus according to the invention.

As shown in FIG. 1 the apparatus includes a vertical tube formed with openings 2. Forms of the openings can be different but, preferably, have the form of slots. The tube encloses an anode space 3 and also forms a support for a helical anode 4 mounted on an outer wall of the tube. A fabric 5 is provided around the anode. The fabric, particularly a filter hose, ensures that the ion exchange material layer 6 surrounding the fabric and disposed circumferentially in a layer, does not pass through the openings 2 into the anode space 3. The ion material is a resin and is formed as spheroids or microspheres. The material, in turn, is encircled by a steel grid 7. The layer can consist of two or more different, mutually bordering different materials 6' and 6''. One of materials exchanging the cations and the other exchanging the anions. One of the layers encountering the flow first is exposed to removing anions or cations before the next layer.

A plastic tube 8 is spaced radially outwardly and coaxial with the grid 7. The tube 8 is provided with an inner wall against which a cathode 9 rests in a spiral fashion. As a result of the mutual position of the elements an annular treatment space 10 between the inner wall of the tube 8 and the layer 6. The space is open at opposite top and bottom ends.

Each of the elements described above including the tube 8 is spaced generally equidistantly from the inner wall of a container 11.

During a water treatment mode, untreated water flows through a pipe L1 opening in the interior of the anode space 3 and leaves calcium behind in the resin of the ion exchange material 6 in exchange for hydrogen ions.

In a regeneration mode, hydrogen ions migrate from the anode to the cathode and displace the calcium ions in the resin, which migrate to the cathode and are flocculated by high pH.

A second inlet pipe L2 extends downwardly from the top of the container 11 through an upper lid 12. The pipe L2 opens approximately in a central region of the container outside the tube 8. A third pipe L3 opening in a lower region of the container is formed with at least one another opening 13 in an upper region of the container. A venting pipe L4 opens in the upper region and a desludging pipe L5 opens in the lowermost region, i.e. settling space 14. As is seen in FIG. 1 the pipes L2–L5 extend through the outer space, i.e. reservoir, 15 which surrounds the tube 8.

All pipes extend through the lid 12 and are connected with a multiway valve 16 mounted on a top of the lid. An inlet 20 supplying the liquid to be treated, water outlet 21, venting and desludging pipes 22, 23 and a vent 24 for the anode space are all connected with the valve. The valve is provided with a valve control element 17 having a plurality of separate pistons mounted on a rod 19 in a variety of positions defining thereby different operating modes of the apparatus. The rod is actuated by any conventional electrical means controlled, in turn, by electronic means.

Figure 2:
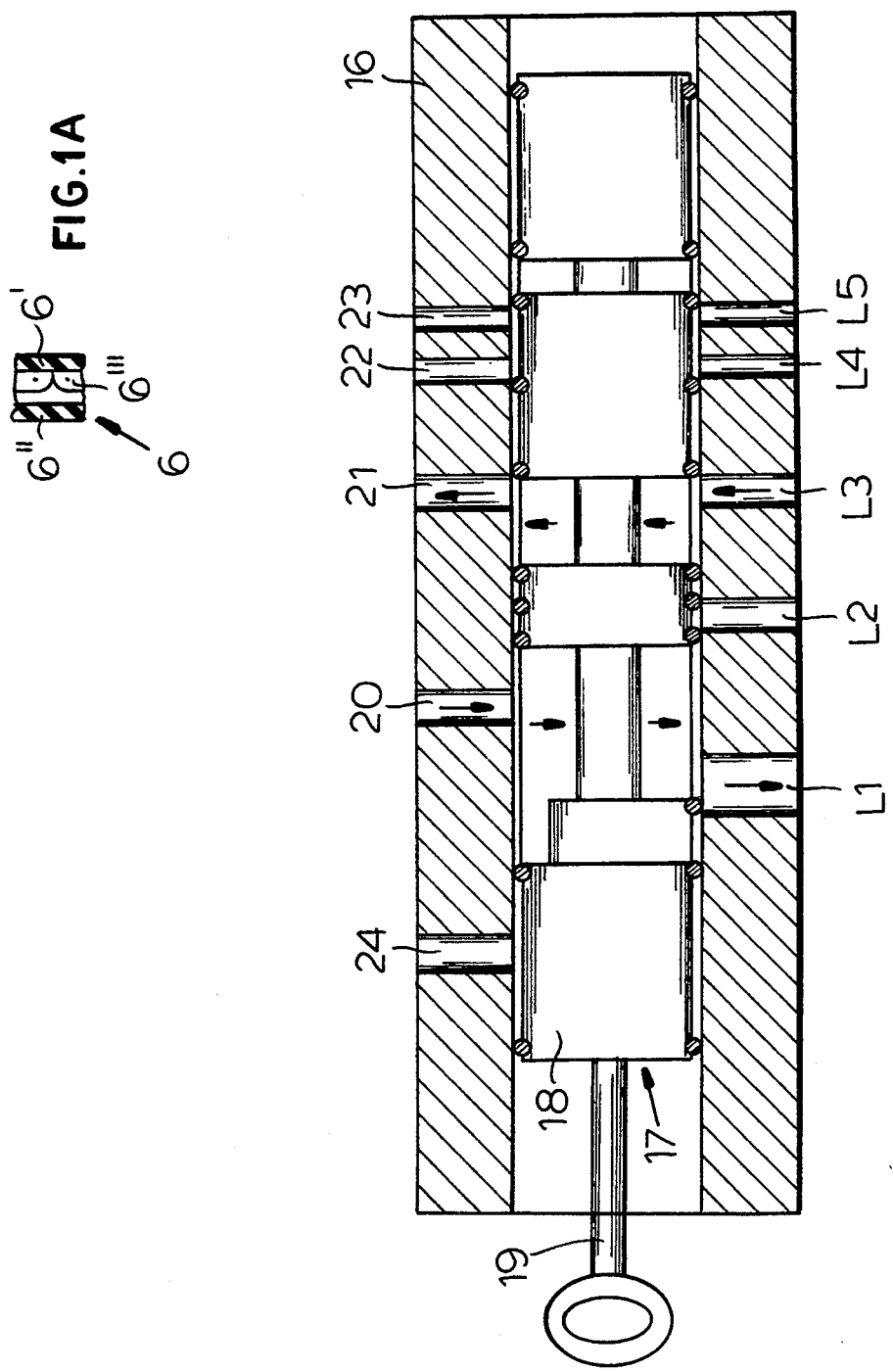
FIG. 2 is a section through the multiway valve in the operating position according to the invention.

The apparatus functions as follows:

FIG. 2 represents the operating mode in which pipes L2, L4 and L5 are closed and untreated water is fed through the pipe L1 into the anode space and is drained through the pipe L3 upon treating.

Figure 3:
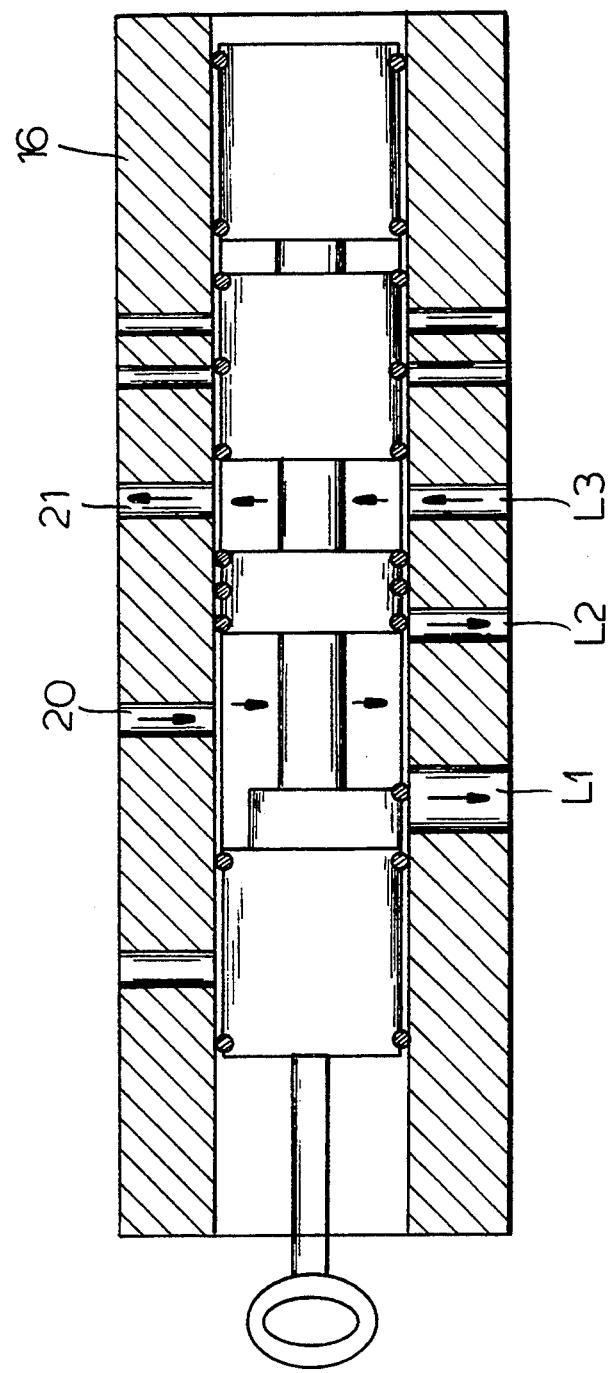
FIG. 3 is a section through the multiway valve in the mixing position.

FIG. 3 illustrates the mixing mode characterized by closed pipes L4 and L5. The liquid to be treated is fed through both pipes L1 and L2, so that part of the untreated liquid enters the anode space while the other part passes into the outer space. As a result, the water emerging upon treatment is not excessively treated.

Figure 4:
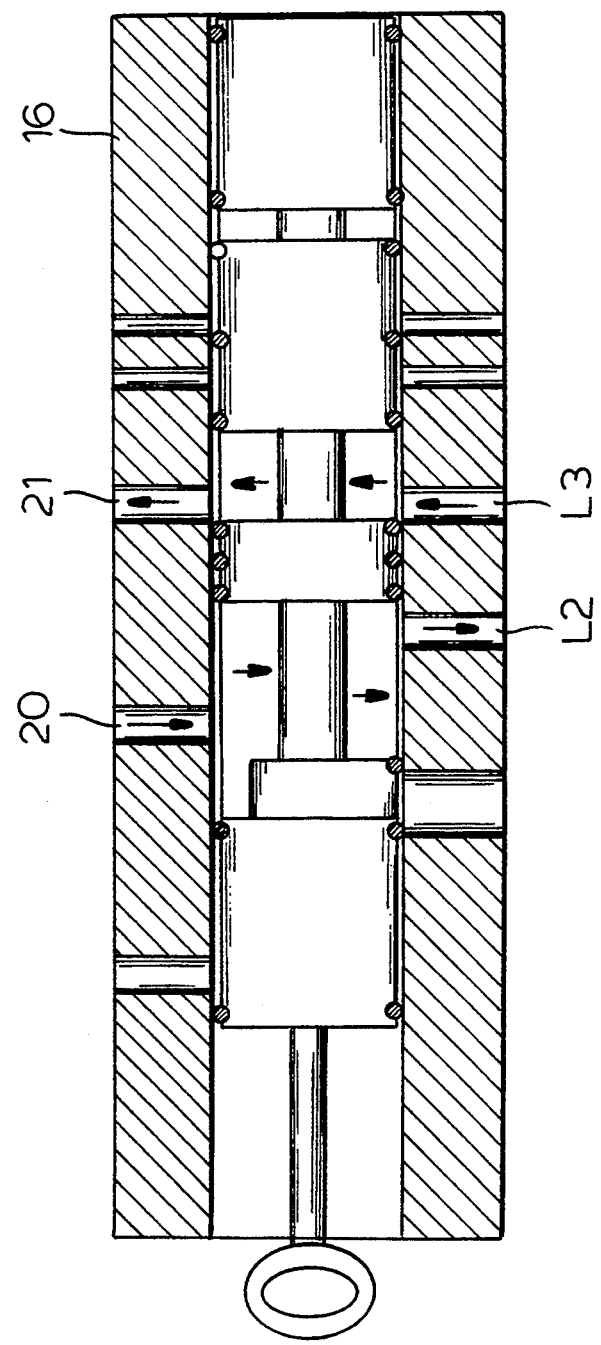
FIG. 4 is a section through the multiway valve in the low treatment position.

FIG. 4 shows the least treatment mode in which pipes L1, and L4–L5 are closed and the untreated liquid enters the outer space through the pipe L2. Such combination defines the least possible treatment. The treated water is conveyed through the pipe L3. In order to balance a degree of treatment, the apparatus can alternate between modes I–III by means of a control or regulating device.

Figure 5:
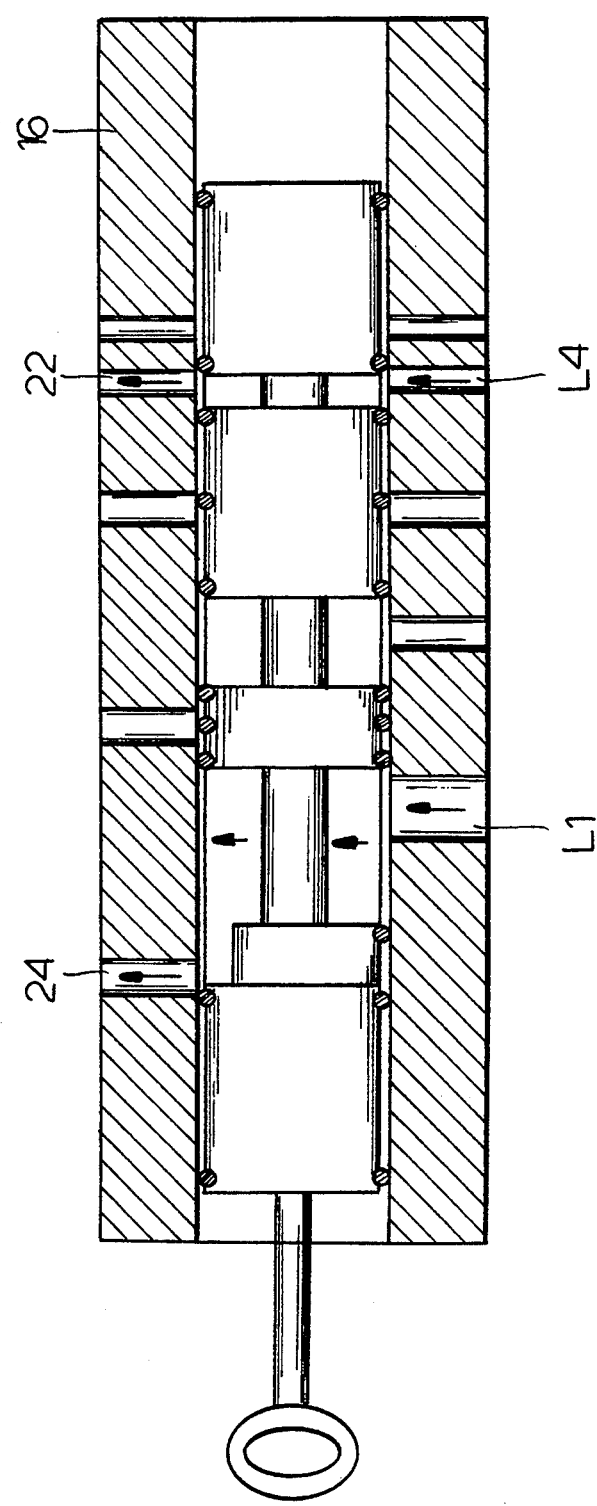
FIG. 5 is a section through the multiway valve in the regeneration position.

The regeneration mode shown in FIG. 5 is defined by pipes L2–L3 and L5 being closed and a rectified voltage applied to the anode and cathode. The ion migration causes a displacement of cations, e.g. calcium, adsorbed on the layer 6 with hydrogen ions. Increasing amount of cations and hydroxyl ions in the outer 10 and treatment 15 spaces leads to simultaneous regeneration of the ion exchanger material, to desiccation of hydroxides and carbonates in the outer space and treatment space and settling of the latter in the settling space 14.

The anions, e.g. chloride, nitrate etc., accumulate in the resin 6 adjacent anode space 3 connected with the valve line 16.

During the regeneration mode, continuous water extraction is ensured by a corresponding apparatus connected in parallel and operated in the treatment phase.

Figure 6:
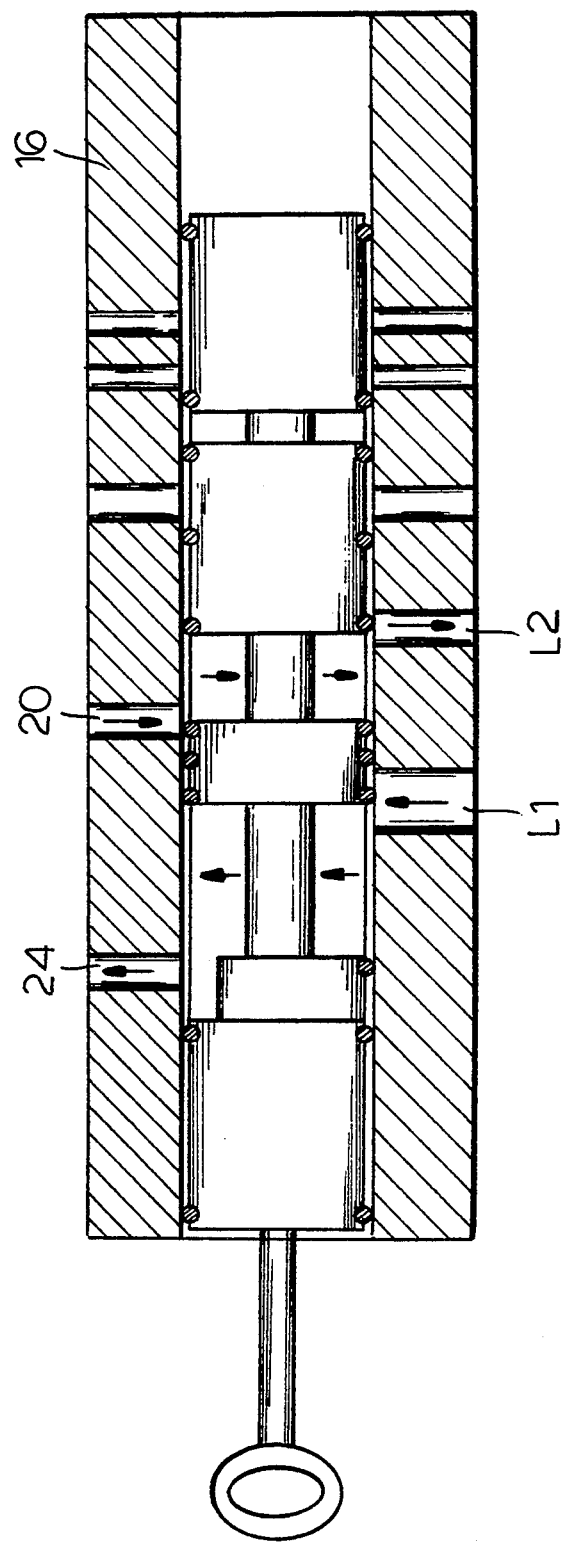
FIG. 6 is a section through the multiway valve in the flushing position.

FIG. 6 illustrates the flushing mode characterized by pipes L3–L5 being closed, the pipe L2 feeding the liquid to be treated and the pipe L1 evacuating the liquid from the anode space. Undesired anions are flushed out along with treated water. This mode lasts for a very brief period of time measured in seconds.

Figure 7:
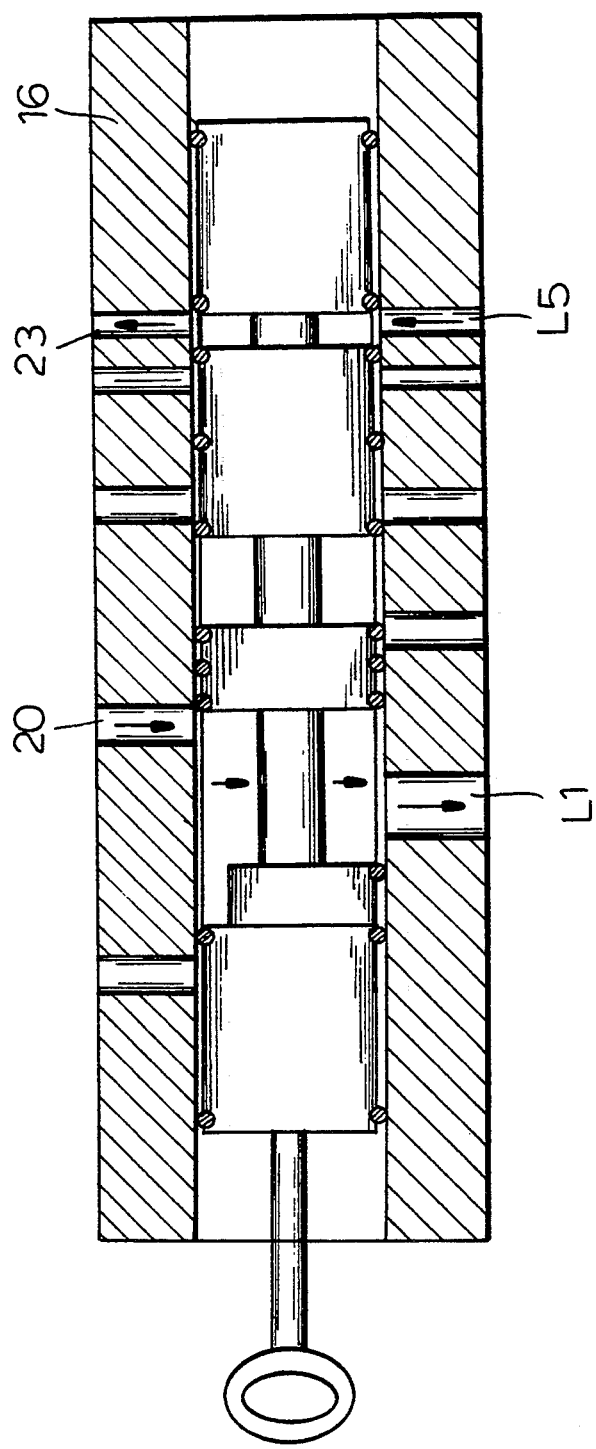
FIG. 7 is the multiway valve in the desludging position.

Finally, FIG. 7 represents the desludging mode in which pipes L1, L3–L4 are closed. The liquid to be treated is delivered through the pipe L1 and sludge is forced out through the pipe L5. The mode also lasts only seconds.

The layer 6 can be composed of an anion-exchange layer 6' followed by a cation-exchange layer 6" in the direction of flow of the liquids through the ion exchange body 6 and the layers 6 and 6" can be separated by a permeable wall or partition 6''', e.g. a filter or sieve cloth or a mesh, fleece or perforated foil. The inner layer or cation exchanger can be a zeolite and/or a highly acid SO$_3$H group exchanger of the polystyrene base type while the anion exchanger can be a apatite and/or a strongly basic anion exchanger with NH$_4$OH group.

TABLE

| | Ion Exchange Materials | |
|---|---|---|
| | INNER LAYER Cation Exchanger | OUTER LAYER Anion exchanger |
| Natural Minerals | Zeolite Na$_2$(Si$_3$Al$_2$O$_{10}$).2H$_2$O | Apatite Ca$_5$Cl(PO$_4$)$_3$ Ca$_5$F(PO$_4$)$_3$ |
| Synthetic Resins | Polystyrene Based | |
| | Strongly Acid Functional Groups —SO$_3$$^-$H$^+$ | Strong Base Functional Groups —NH$_4$$^+$$^-$OH |

Figure 8:
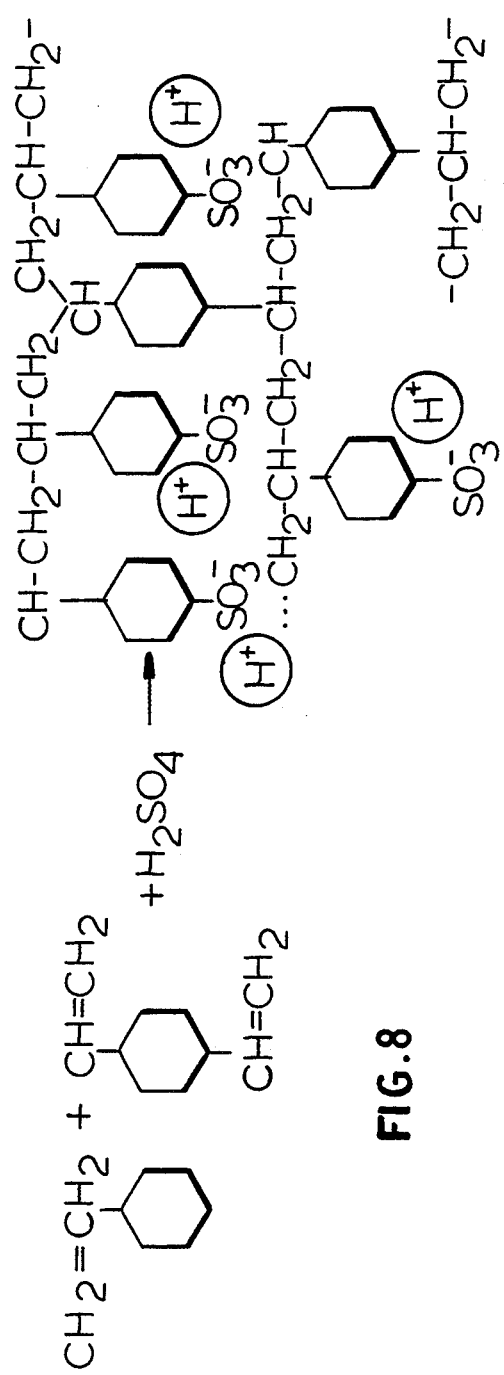
FIG. 8 is a formula showing the formation of a strongly acid cation exchanger.
Figure 9:
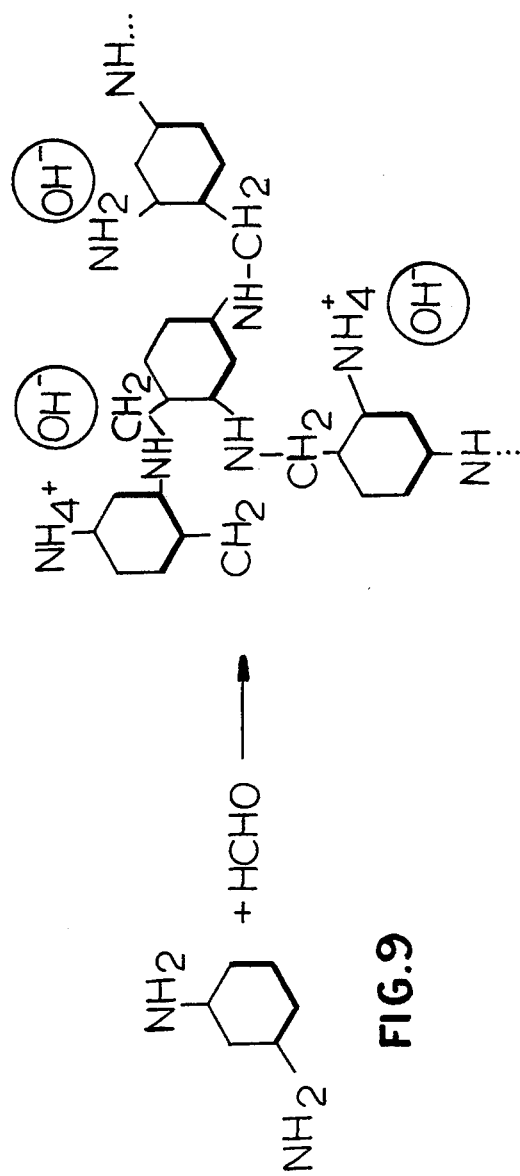
FIG. 9 is a formula showing a strongly basic anion exchanger.

FIG. 8 shows the formation of a polystyrene based cation exchanger having strongly acid functional groups of the —SO$_3$—, H$^+$ type while FIG. 9 shows the formation of a polystyrene based anion exchanger having fully basic functional groups of the type NH$_4$$^+$, OH$^-$ type.

We claim:

1. An apparatus for removing cations and anions from liquid, comprising:
   a container having a vertical axis and formed with an inner peripheral wall bridging a bottom and a top of said container;
   an elongated tubular anode mounted equidistantly from said inner wall in said container coaxially therewith and with spacing from said tip and bottom, said tubular anode having an inner chamber open at opposite ends;
   a cathode mounted in said container and spaced radially outwardly from said anode coaxially therewith, said container having an outer chamber outwardly of said cathode, said cathode being open to traversal by said liquid and being spaced form said top and bottom;
   a cylindrical axially elongated body of ion exchange material forming a layer between said anode and cathode in said container, and spaced from said top and bottom, said layer being coaxial with and radially spaced form said cathode, said layer being positioned to be traversed by liquid transversely to said axis, said layer and said cathode defining a treatment space;
   means for filling said container with a liquid to be treated, said outer chamber being provided with a liquid-fill space and said inner chamber being provided with a treatment free liquid-fill space;
   means connected with said cathode and anode for generating an electric field thereacross, said outer chamber and said treatment space being axially open at opposite ends spaced from the bottom and top of said container for communication therebetween for circulation of said liquid;
   means forming a settling space at said bottom, said chambers and said treatment space being open downwardly toward said settling space; and
   means for withdrawing liquid from which said cations and anions have been removed from one of said chambers.

2. The apparatus defined in claim 1 wherein a direct or alternating magnetic field is applied to said cathode and anode and at least one of said cathode and anode is a spiral-shaped electrode.

3. The apparatus defined in claim 1 wherein the body includes at least two mutually bordering layers made of different materials, a first of said layers exchanging cations and a second of said layers exchanging anions, one of the layers encountering the flow first and the other of said layers encountering the flow subsequently for selectively removing anions and cations.

4. The apparatus defined in claim 3 wherein said first layer yields protons and the second layer yields hydroxyl ions stoichiometrically corresponding to said protons, so that protons and hydroxyl ions neutralize each other during the passage of liquid flow to be treated and the liquid reaches a desired pH-value.

5. The apparatus defined in claim 3 wherein said one and other layers are separated by a permeable dividing wall preventing materials of the layers from mixing.

6. The apparatus defined in claim 5 wherein said dividing wall is a filter comprising a sieve cloth or mesh, fleece or perforated foil.

7. The apparatus defined in claim 5 wherein said dividing wall surrounds the cathode.

8. The apparatus defined in claim 7 wherein said dividing wall is slotted.

9. The apparatus defined in claim 1 wherein said elongated anode is mounted centrally in the container, the body, the treatment space, and the cathode being arranged coaxially around the anode.

10. The apparatus defined in claim 9, further comprising an perforated inner tube mounted centrally in the container, the anode being mounted spirally around the inner tube.

11. The apparatus defined in claim 9 wherein the body is limited at least from one side by a grid, fabric or mesh.

12. The apparatus defined in claim 9 wherein said container extends along an upright axis.

13. The apparatus defined in claim 1, further comprising, a first water inlet pipe opening into the inner chamber;

a second inlet pipe opening in the treatment space; and a water discharge pipe provided with two openings in said outer chamber.

14. The apparatus defined in claim 13, further comprising a multiway valve connecting the pipes.

15. The apparatus defined in claim 14 wherein the valve is controlled and defines six modes of operation.

16. A method for operating an apparatus for purifying a liquid comprising:

an elongated container having an inner peripheral wall;

a tube formed with a perforated periphery and provided with an anode mounted on said tube in said container;

a layer of ion exchange material in said container spaced radially outwardly from said anode, and a cathode spaced radially outwardly from said layer in said container, said cathode forming an outer space with said container and a treatment chamber with said layer, said chambers being in a flow communication with each other; said method comprising the steps of: (a) selectively: ($a_1$) introducing said liquid into said tube, treating thereby the liquid by exchanging calcium ions precipitated on said layer for hydrogen ions upon circulating said liquid between said chambers and extracting the liquid from said container, ($a_2$) introducing the liquid into said tube and into said outer space, treating thereby said liquid and extracting the liquid from said container, and ($a_3$) introducing said liquid into said outer space, treating thereby said liquid and extracting the liquid from said container; (b) thereafter interrupting introducing of the liquid into said outer space; and (c) thereafter applying an electric field to said anode and cathode, regenerating thereby said layer by displacing calcium ions in said layer with hydrogen ions migrating from said anode to said cathode in said field.

17. The method defined in claim 16, further comprising the steps of removing a sludge from said container.

* * * * *